(12) United States Patent
Hong

(10) Patent No.: US 12,344,358 B1
(45) Date of Patent: *Jul. 1, 2025

(54) ORBITAL MANEUVER APPARATUS

(71) Applicant: Ruiqing Hong, Chino, CA (US)

(72) Inventor: Ruiqing Hong, Chino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/066,792

(22) Filed: Feb. 28, 2025

Related U.S. Application Data

(63) Continuation-in-part of application No. 18/927,765, filed on Oct. 25, 2024, now Pat. No. 12,269,583.

(51) Int. Cl.
  *B64C 15/14* (2006.01)
  *B63B 39/08* (2006.01)
  *B64G 1/26* (2006.01)

(52) U.S. Cl.
  CPC .............. *B63B 39/08* (2013.01); *B64C 15/14* (2013.01); *B64G 1/26* (2013.01); *B64G 1/262* (2023.08)

(58) Field of Classification Search
  CPC ........... B64C 15/14; B63B 39/08; B64G 1/26; B64G 1/262
  See application file for complete search history.

(56) References Cited

U.S. PATENT DOCUMENTS

| | | | | |
|---|---|---|---|---|
| 4,231,315 A | * | 11/1980 | Tachibana | B63B 39/08 60/221 |
| 6,032,904 A | * | 3/2000 | Hosick | B64G 1/411 244/169 |
| 9,187,175 B1 | * | 11/2015 | Chen | B64C 39/005 |
| 10,232,959 B2 | * | 3/2019 | Moro | B64G 1/286 |
| 12,269,583 B1 | * | 4/2025 | Hong | B64C 15/14 |

* cited by examiner

*Primary Examiner* — Lorne E Meade
(74) *Attorney, Agent, or Firm* — Tsz Lung Yeung

(57) ABSTRACT

An orbital maneuver apparatus includes a fluid supply arrangement, a main body, an actuation head, and a nozzle assembly. The main body includes an outer housing, an inner housing mounted in the outer housing such that the inner housing is arranged to rotate about a longitudinal direction of the main body, wherein the fluid supply tube extends in the inner housing of the main body and is stationary with respect to the outer housing. The actuation head is connected to the inner housing of the main body to rotate along with the inner housing. The nozzle assembly includes a first nozzle head and a second nozzle head which are in fluid communication with the fluid supply arrangement, and are both movably supported in the actuation cavity and are arranged to rotate correspondingly with the actuation head, and to further rotate about a transverse direction of the main body.

11 Claims, 7 Drawing Sheets

US 12,344,358 B1

ORBITAL MANEUVER APPARATUS

CROSS REFERENCES OF RELATED APPLICATIONS

This is a Continuation-In-Part (CIP) of a non-provisional application Ser. No. 18/927,765 and a filing date of Oct. 25, 2024, the entire contents of which are hereby incorporated by reference.

BACKGROUND OF THE PRESENT INVENTION

Field of Invention

The present invention relates to orbital maneuver technology, and more particularly to an orbital maneuver apparatus which is capable of being installed in an object in motion, such as a flying object.

Description of Related Arts

Objects in motion, whether they are space shuttles, aviation aircrafts, rockets, missiles flying in the sky, or moving objects sailing on water or moving underwater, will encounter resistance from air or water in the course of the flight or sailing, and will have a need to change its moving directions or paths, which we call "orbital change". The existing orbital change methods mainly rely on mechanical actuation of mechanical parts installed in the flying objects to carry out obit transfer.

The followings are examples of existing technologies for changing orbits for a flying object:

In an aircraft, such as a commercial or military aircraft, may change course by deflecting air in a desirable direction, and this is usually accomplished by tilting the plane's wings (such as the rudders and ailerons) so the force vector of the wings, normally all upwards, turns to be partially sideways.

When the aircraft needs to descend or ascend, the elevators of the aircrafts must be driven so as to change the pitch of the aircraft. Elevators may be located on the horizontal stabilizers.

A major disadvantage of these traditional methods in maneuvering orbits of a flying object is that the power for all orbit-changing mechanisms originates from the main engines of the aircrafts. The engineering requirements of an aircraft engine should have been lightweight, small in size and sufficient in power. These requirements may not be satisfactorily achieved when the main engines also need to provide power for changing orbits. Similarly, sea vehicle also encounter water resistance when traveling. Existing orbit changing mechanisms are also not satisfactory.

As a result, there is a need to develop an apparatus which may effectively and efficiently assist a traveling object to perform change of orbit.

SUMMARY OF THE PRESENT INVENTION

Certain variations of the present invention provide an orbital maneuver apparatus for a traveling object, and is capable of being installed therein and allow the traveling object to perform effective and efficient orbital change.

Certain variations of the present invention provide an orbital maneuver apparatus which is mounted at specific positions of a traveling object, and which utilizes high-pressure fluid to be ejected by a nozzle assembly so as to perform orbital change to traveling object.

Certain variations of the present invention provide an orbital maneuver apparatus which allows a traveling object to perform orbital maneuver without relying on conventional mechanisms such as wings or propellers.

Certain variations of the present invention provide an orbital maneuver apparatus, comprising:

a fluid supply arrangement which comprises a control valve connecting to a source of compressed fluid, and a fluid supply tube connecting to the control valve;

a main body which comprises an outer housing, an inner housing mounted in the outer housing in such a manner that the inner housing is arranged to rotate about a longitudinal direction of the main body, the fluid supply tube extending in the inner housing of the main body being stationary with respect to the outer housing;

an actuation head connected to the inner housing of the main body so that the when the inner housing rotates with respect to the outer housing, the actuation head is also driven to rotate in a synchronized manner along the longitudinal direction of the main body, the actuation head having an actuation cavity formed therein; and a nozzle assembly which comprises a first nozzle head and a second nozzle head which are in fluid communication with the fluid supply tube, and are both movably supported in the actuation cavity and are arranged to rotate correspondingly with the actuation head, the first nozzle head and the second nozzle head being arranged to further rotate about a transverse direction of the main body, so that the first nozzle head and the second nozzle head are arranged to be controlled to selectively point toward predetermined orientations respectively, such that when the compressed fluid is arranged to eject through the first nozzle head and the second nozzle head, the orbital maneuver apparatus is arranged to change an orbit of a traveling object on which the orbital maneuver apparatus is mounted.

This summary presented above is provided merely to introduce certain concepts and not to identify any key or essential features of the claimed subject matter.

DETAILED DESCRIPTION OF THE PREFERRED EMBODIMENT

Figure 1:
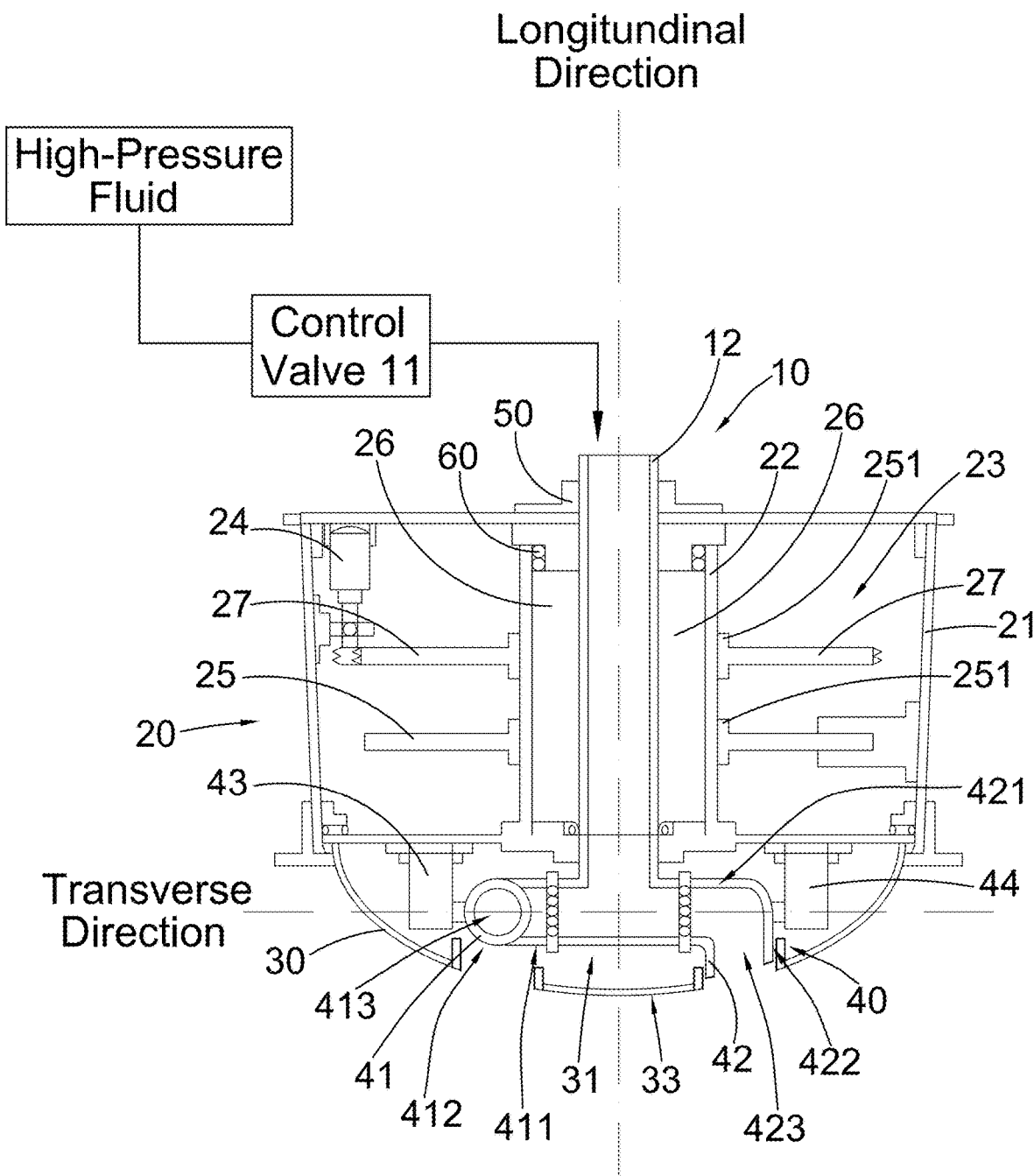
FIG. 1 is a sectional schematic view of an orbital maneuver apparatus according to a preferred embodiment of the present invention.
Figure 2:
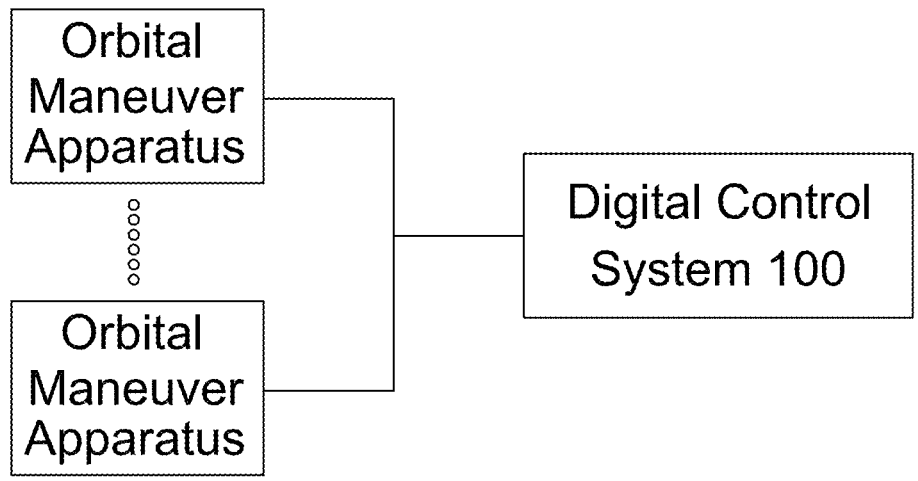
FIG. 2 is a block diagram of the orbital maneuver apparatus according to a preferred embodiment of the present invention, illustrating a plurality of orbital maneuver apparatuses may be controlled by a digital control system.
Figure 3:
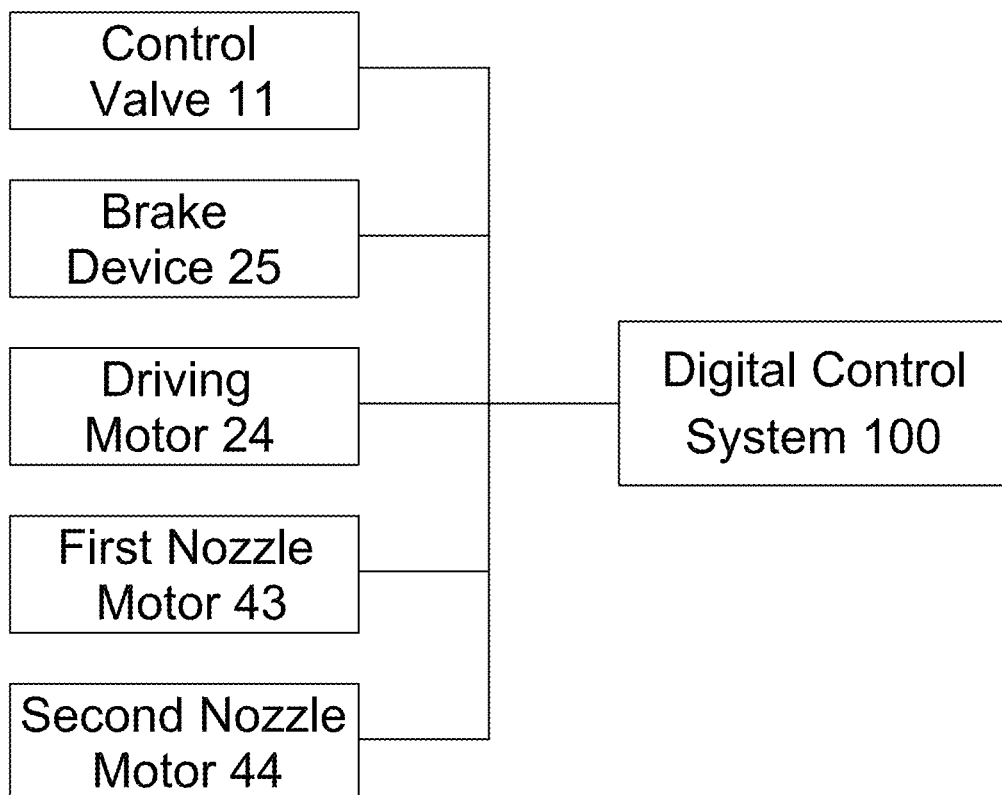
FIG. 3 is a block diagram of the orbital maneuver apparatus according to a preferred embodiment of the present invention, illustrating a digital control system may centrally control different components of an orbital maneuver apparatus.

The following detailed description of the preferred embodiment is the preferred mode of carrying out the invention. The description is not to be taken in any limiting sense. It is presented for the purpose of illustrating the general principles of the present invention.

In the following descriptions, it should also be appreciated that the terms "arrange" and "set" in the following description refer to the connecting relationship in the accompanying drawings for easy understanding of the present invention. For example, the "arrange" and "set" can refer to one element directly or indirectly set or arrange on another element. Therefore, the above terms should not be an actual connection limitation of the elements of the present invention.

It should also be appreciated that the terms "center", "length", "width", "thickness", "top", "bottom", "front", "rear", "left", "right", vertical ", "horizontal", "inclined", "upper", "lower", "interior", and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

Moreover, it should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection can refer to permanent connection or detachable connection. Therefore, the above terms should not be an actual connection limitation of the elements of the present invention.

Referring to FIG. 1 to FIG. 3, FIG. 4A to FIG. 4B, FIG. 5A to FIG. 5B, FIG. 6A to FIG. 6B, FIG. 7A to FIG. 7C and FIG. 8 of the drawings, an orbital maneuver apparatus according to a preferred embodiment of the present invention is illustrated. The orbital maneuver apparatus is for changing the orbit of an object travelling through fluid, such as an air vehicle or a sea vehicle, or an object for military use such as jet fighters, rockets, drones, satellites etc. The orbital maneuver apparatus may comprise a fluid supply arrangement 10, a main body 20, an actuation head 30, and a nozzle assembly 40. The object may travel in fluid (air or water), or in vacuum (such as satellites) (hereinafter referred to as "traveling object 200" unless otherwise specified).

The fluid supply arrangement 10 may comprise a control valve 11 connecting to a source of high-pressure fluid, and a fluid supply tube 12 connecting to the control valve 11. The compressed fluid may be high-pressure fluid such as compressed air or water.

The main body 20 may comprise an outer housing 21, an inner housing 22 mounted in the outer housing 21 in such a manner that the inner housing 22 is arranged to rotate about a longitudinal direction of the main body 20. The fluid supply tube 12 may extend in the inner housing 22 of the main body 20 and may be stationary with respect to the outer housing 21.

The actuation head 30 may be connected to the inner housing 22 of the main body so that when the inner housing 22 rotates with respect to the outer housing 21, the actuation head 30 is also driven to rotate in a corresponding manner along the longitudinal direction of the main body 20. The actuation head 30 may have an actuation cavity 31 formed therein.

The nozzle assembly 40 may comprise a first nozzle head 41 and a second nozzle head 42 which are in fluid communication with the fluid supply tube 12, and are both movably supported in the actuation cavity 31 and are arranged to rotate correspondingly with the actuation head 30. The first nozzle head 41 and the second nozzle head 42 may be arranged to further rotate about a transverse direction of the main body 20, so that the first nozzle head 41 and the second nozzle head 42 may be arranged to be controlled to selectively point toward predetermined directions respectively, such that when the compressed fluid is arranged to eject through the first nozzle head 41 and the second nozzle head 42, the orbital maneuver apparatus may be arranged to change an orbit of the traveling object 200 on which the orbital maneuver apparatus is mounted.

According to the preferred embodiment of the present invention, the orbital maneuver apparatus of the present invention may be installed in an object which travels in fluid, such as an air vehicle, a sea vehicle, a rocket, a satellite, a missile etc. (i.e. "traveling object 200"). The air traveling object may be a commercial aircraft, a military aircraft, a drone, while the sea traveling object may be a ship, a naval ship, a submarine etc. The function of the orbital maneuver apparatus may be to perform orbital change of that traveling object while the traveling object is operating. Orbital change may refer to change an orbit of the object, such as but not limited to turning, ascending, descending, accelerating or decelerating etc. Note that the traveling object 200 may be equipped with one or more orbital maneuver apparatuses of the present invention for effective change of orbit. These orbital maneuver apparatuses may be provided in predetermined positions on the traveling object 200 and may be centrally controlled by a digital control system 100 using dedicated software and Artificial Intelligence (AI).

The fluid supply arrangement 10 may be connected to a source of compressed fluid (high pressure fluid) for changing the orbit of the traveling object 200. The control valve 11 may be connected to the source so that high pressure fluid may be taken in the main body 20 through the control valve 11. High pressure fluid may be produced in the traveling object 200 via another system. The high-pressure fluid may be fed to pass through the fluid supply tube 12 which may extend into the main body 20.

The main body 20 may be connected to the fluid supply arrangement 10 and may have a receiving cavity 23. A longitudinal direction of the main body 20 may be illustrated in FIG. 1 of the drawings. The main body 20 may be configured from strong, durable, temperature resistance, anti-corrosive yet light material, such as metallic or composite materials. The outer housing 21 of the main body 20 may be kept stationary and may be mounted on the traveling object 200 at positions which best initiate change of orbit. For example, several orbital maneuver apparatuses may be provided (through direct mounting or other fluid piping systems) at the bottom or two sides of the traveling object 200 for effectuating vertical ascend of the traveling object 200. According to the preferred embodiment of the present invention, the outer housing 21 of the main body 20 may be configured as having a substantially circular cross-sectional shape. The main body 20 may thus have a generally cylindrical structure.

The inner housing 22 of the main body 20 may be mounted in the receiving cavity 23 in a rotatably movable manner. Specifically, the inner housing 22 may be driven to rotate about the longitudinal direction of the main body 20. Thus, the main body 20 may further comprise at least one driving motor 24 mounted in the receiving cavity 23 for driving the inner housing 22 to rotate with respect to the outer housing 21. The inner housing 22 and the actuation head 31 selectively rotate in a 360° range about the longitudinal direction of the main body 20. The driving motor 24 may be arranged to drive the inner housing 22 to rotate through a gear mechanism, such as a gear plate 27. The gear plate may connect the inner housing 22 to the driving motor 24.

As shown in FIG. 1 of the drawings, the inner housing 22 may also be configured as having a cylindrical and hollow structure, wherein the fluid supply tube 12 may extend through the inner housing 22 along a longitudinal direction of the main body 20. It is expected that the high-pressure fluid supplied through the control valve 11 will have very high temperature, and therefore the fluid supply tube 12 may be configured by materials which may withstand high temperature and pressure, such as metallic or composite material.

The main body 20 may further comprise a brake device 25 comprising at least one braking disc 251 mounted in the receiving cavity 23 and engage with an exterior surface of the inner housing 22 so as to selectively perform deceleration thereof. The brake device 25 may be electrically connected to the digital control system 100 so as to control the rotation of the inner housing 22 with respect to the outer housing 21.

One skilled in the art would appreciate that by selectively driving the inner housing 22 to rotate or to stop from rotation, the actuation head 30 may also be driven to rotate or to stop from rotation in a synchronized manner. The speed and duration of rotation may be controlled by the digital control system 100.

Since the high-pressure fluid passing through the fluid supply tube 12 is of very high temperature, the space between the fluid supply tube 12 and the inner housing 22 of the main body 20 may be effectively insulated so as to minimize the heat transferring to the inner housing 22 or other components of the orbital maneuver apparatus of the present invention. As such, the main body 20 may further comprise a heat insulation arrangement 26 provided between the fluid supply tube 12 and the inner housing 22 of the main body so as to prevent heat from transferring to the surrounding components. The heat insulation arrangement 26 may be configured as having a heat insulating layer, a vacuum layer, or other mechanisms.

The actuation head 30 may be provided underneath the main body 20 and connected to the inner housing 22 in such a manner that the actuation head 30 may rotate in accordance and synchronized with the rotation of the inner housing 22. As shown in FIG. 1 of the drawings, the actuation head 30 may have a hollow structure and may have a convexly curved exterior surface 33 which may resemble an inverted mushroom. The inner housing 22 and the actuation head 30 may be arranged to be rotatable through flanges 50, bearings 60, and a preferably a gear assembly.

The fluid supply tube 12 may extend in the actuation cavity 31 of the actuation head 30. The first nozzle head 41 and the second nozzle head 42 may be connected to the fluid supply tube 12 in the actuation cavity 31 so that the fluid supply tube 12 may be in fluid communication with the first nozzle head 41 and the second nozzle head 42. As such, the high-pressured fluid from the fluid supply arrangement 10 may be guided to reach the first nozzle head 41 and the second nozzle head 42 through the fluid supply tube 12. In other words, the fluid supply tube 12, the first nozzle head 41 and the second nozzle head 42 may form a three-way passage structure.

The first nozzle head 41 may be connected to the fluid supply tube 12 in the actuation cavity 31 in a pivotally movable manner. The first nozzle head 41 may have a first connecting portion 411 and a first ejection portion 412 extending from the first connecting portion 411. According to the preferred embodiment of the present invention, the first connecting portion 411 may extend along a transverse direction of the main body 20, while the first ejection portion 412 may extend along a longitudinal direction of the main body 20 to form a substantially L-shaped structure of the first nozzle head 41, as illustrated in FIG. 1 of the drawings. The first nozzle head 41 may be mounted in the actuation cavity 31 in a pivotally movable manner. Specifically, the first nozzle head 41 may be mounted in the actuation cavity 31 in such a manner that the first nozzle head 41 may pivotally move about a transverse direction of the main body 20. In this preferred embodiment, a range of pivotal movement of the first nozzle head 41 may be approximately 180°.

The first nozzle head 41 may have a first ejection channel 413 extending along the first connecting portion 411 and the first ejection portion 412 for allowing passage of high-pressure fluid. The first ejection channel 413 may therefore communicate with the fluid supply tube 12.

Similarly, the second nozzle head 42 may also be connected to the fluid supply tube 12 in the actuation cavity 31 in a pivotally movable manner. The second nozzle head 42 may have a second connecting portion 421 and a second ejection portion 422 extending from the second connecting portion 421. According to the preferred embodiment of the present invention, the second connecting portion 421 may extend along a transverse direction of the main body 20, while the second ejection portion 422 may extend along a longitudinal direction of the main body 20 to form a substantially L-shaped structure of the second nozzle head 42, as illustrated in FIG. 1 of the drawings. The second nozzle head 42 may be mounted in the actuation cavity 31 in a pivotally movable manner. Specifically, the second nozzle head 40 may be mounted in the actuation cavity 31 in such a manner that the second nozzle head 42 may pivotally move about a transverse direction of the main body 20. In this preferred embodiment, a range of pivotal movement of the second nozzle head 42 may be approximately 180°.

The second nozzle head 42 may have a second ejection channel 423 extending along the second connecting portion 421 and the second ejection portion 422 for allowing passage of high-pressured fluid. The second ejection channel 423 may also communicate with the fluid supply tube 12.

Depending on the circumstances of the use, the nozzle assembly 40 may comprise one nozzle head only. That is, the nozzle assembly 40 may comprise only the first nozzle head 41 connected to the fluid supply tube 12. The structure of the first nozzle head 41 may be identical to the first nozzle head 41 described above.

The nozzle assembly 40 may further comprise a first nozzle motor 43 and a second nozzle motor 44 mounted in the actuation head 30 to drive the first nozzle head 41 and the second nozzle head 42 to pivotally move in the manner described above respectively. The first nozzle motor 43 and the second nozzle motor 44 may be electrically connected to the digital control system 100 which may selectively control the operation of the first nozzle motor 43 and the second nozzle motor 44. Thus, by controlling the operation of the first nozzle motor 43 and the second nozzle motor 44, each of the orientation of the first nozzle head 41 and the second nozzle head 42 may be selectively altered so as to alter the ejection angle of the high-pressured fluid.

From the forgoing descriptions, one skilled in the art may appreciate that by controlling the rotation of the actuation head 30 and the pivotal movement of the first nozzle head 41 and the second nozzle head 42, the digital control system 100 may conveniently and precisely control the orientation of the first nozzle head 41 and the second nozzle head 42 so that the ejection of the high-pressured fluid may alter the orbit of the traveling object 200.

Figure 4A:
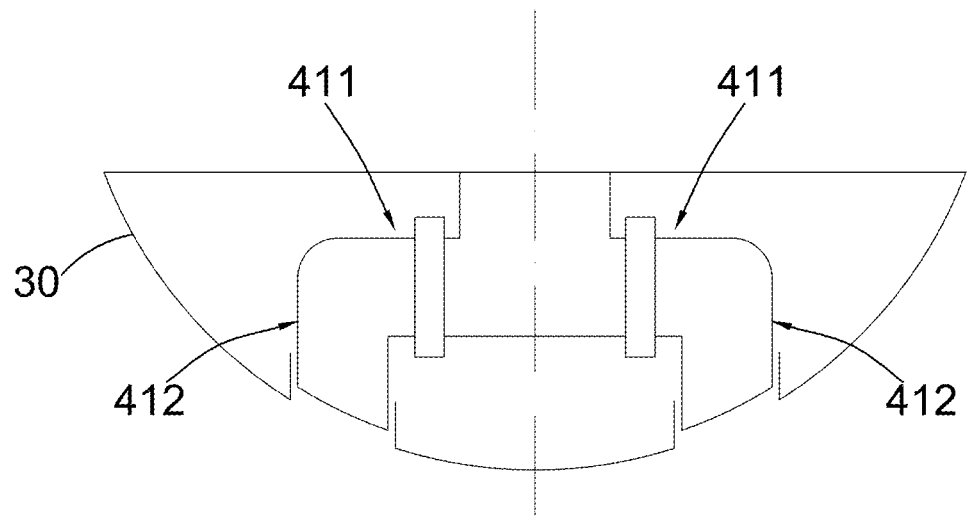
FIG. 4A and FIG. 4B are schematic diagrams of a nozzle assembly of the orbital maneuver apparatus according to a preferred embodiment of the present invention, illustrating that a first nozzle head and a second nozzle head are pointing downwardly.
Figure 4B:
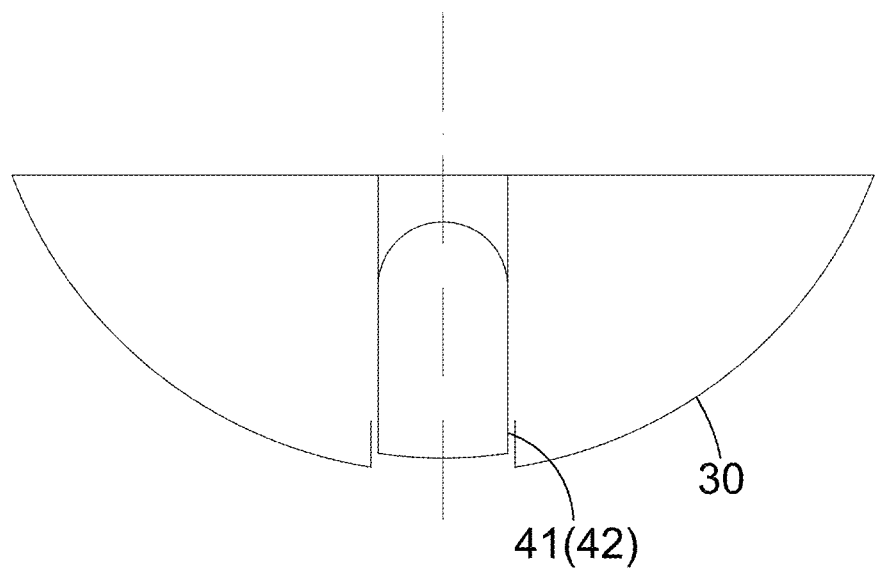

The following examples illustrate how the orbital maneuver apparatus of the present invention may allow the corresponding traveling object 200 to change orbit. As shown in FIG. 4A and FIG. 4B of the drawings, in the situation where several orbital maneuver apparatuses are mounted at a bottom portion of the traveling object 200, the first nozzle head 41 and the second nozzle head 42 may be driven to orient downwardly so that high-pressured fluid may eject downwardly with respect to the traveling object 200 such as an air vehicle. This may allow the traveling object, such as the air vehicle to ascend or hover in the air.

Figure 5A:
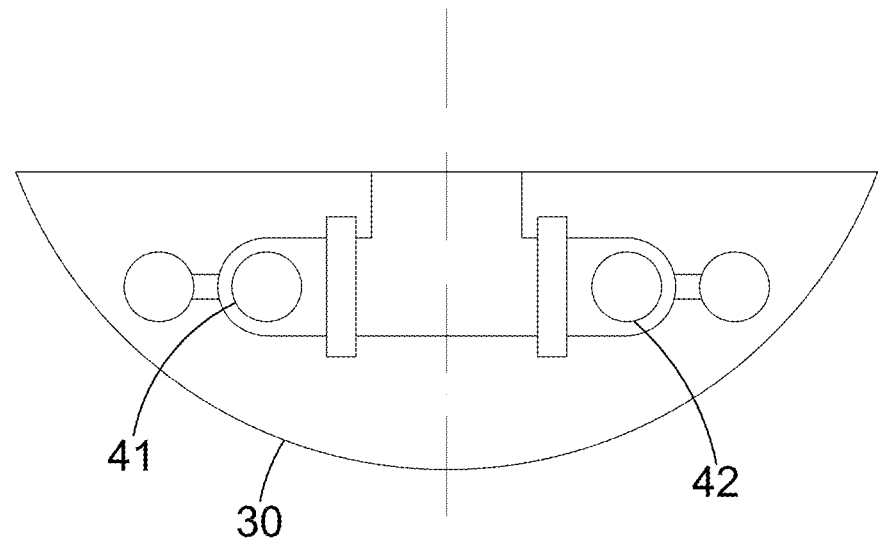
FIG. 5A and FIG. 5B are schematic diagrams of a nozzle assembly of the orbital maneuver apparatus according to a preferred embodiment of the present invention, illustrating that a first nozzle head and a second nozzle head are pointing rearwardly.
Figure 5B:
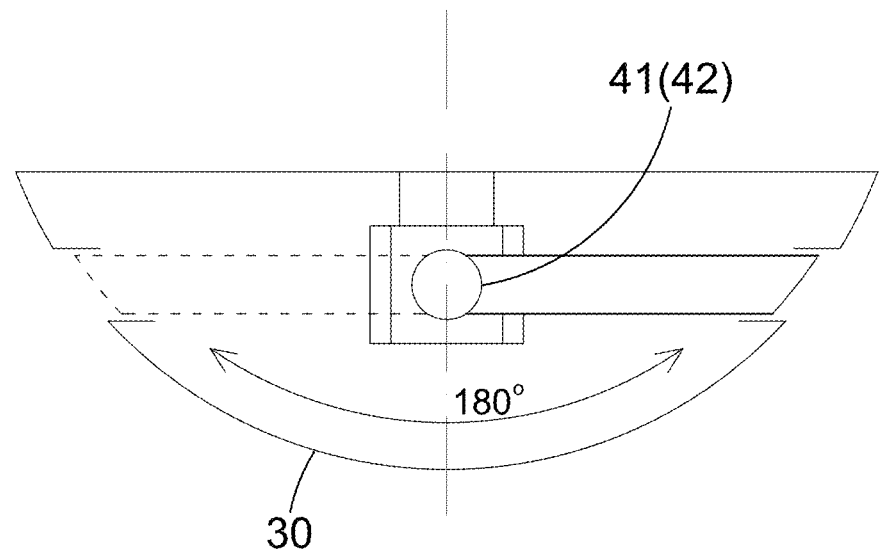

Referring to FIG. 5A and FIG. 5B of the drawings, in the situation where several orbital maneuver apparatuses are mounted at a bottom portion or side portions of the traveling object 200, the first nozzle head 41 and the second nozzle head 42 may be driven to orient rearwardly so that high-pressure fluid may eject rearwardly with respect to the traveling object 200. This may allow the traveling object 200 to propel or travel frontwardly. When the traveling object 200 needs to decelerate, a user may control the digital control system 100 to drive the first nozzle head 41 and the second nozzle head 42 to pivotally move to opposite direction so as to provide a resistance force to allow the traveling object 200 to decelerate.

Figure 6A:
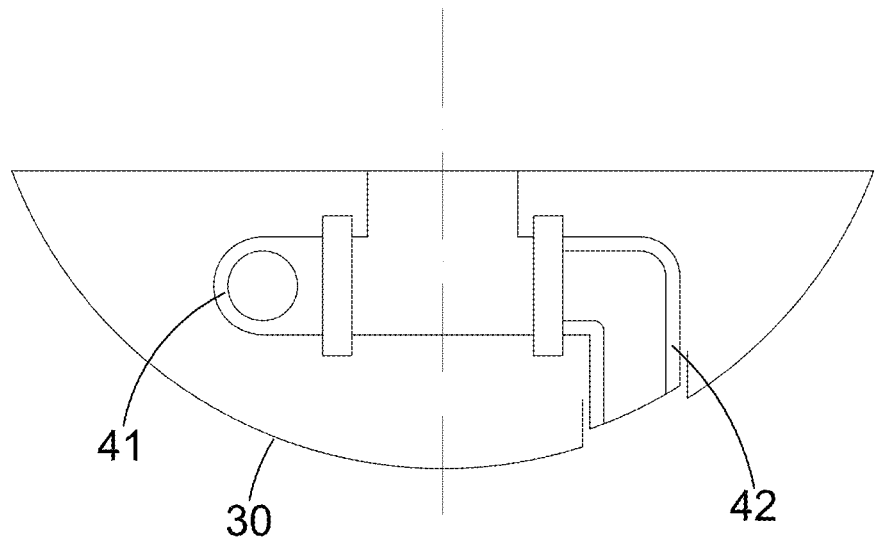
FIG. 6A and FIG. 6B are schematic diagrams of a nozzle assembly of the orbital maneuver apparatus according to a preferred embodiment of the present invention, illustrating that a first nozzle head and a second nozzle head are pointing in different directions.
Figure 6B:
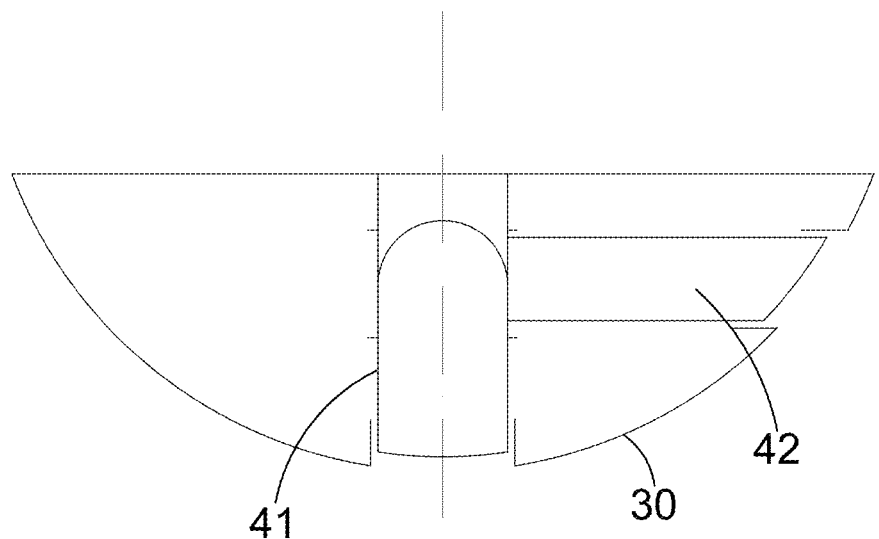

As shown in FIG. 6A and FIG. 6B of the drawings, in the situation where several orbital maneuver apparatuses are mounted at several spots of the traveling object 200, the first nozzle head 41 and the second nozzle head 42 may be driven to orient to point in different directions respectively so that high-pressured fluid may eject in the corresponding directions with respect to the traveling object 200. This may allow the traveling object 200 to perform customized orbital changes.

Figure 7A:
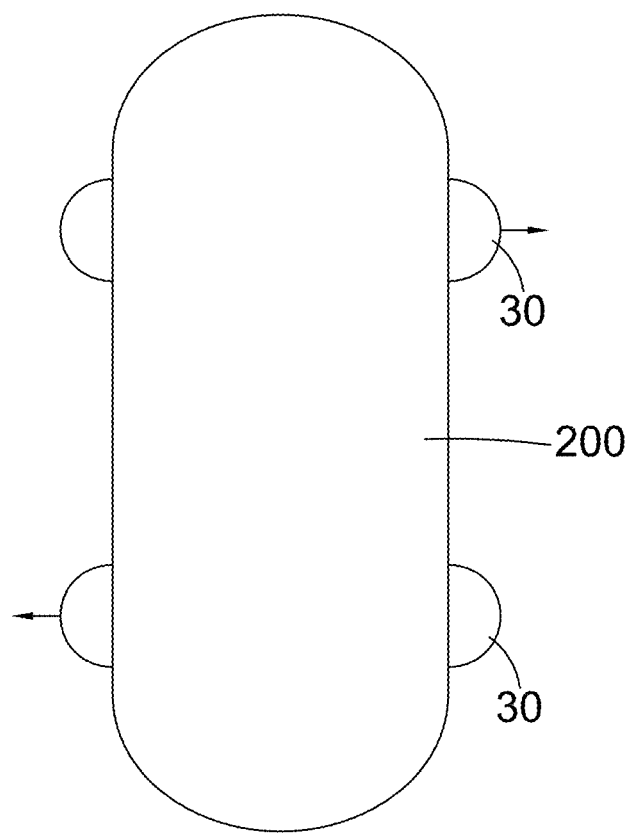
FIG. 7A to FIG. 7C are schematic diagrams of orbital maneuver apparatuses according to a preferred embodiment of the present invention, illustrating that the orbital maneuver apparatuses may assist orbital change of a traveling object such as an air vehicle or a sea vehicle.

Referring to FIG. 7A of the drawings, in the situation where several orbital maneuver apparatuses are mounted at two sides of the traveling object 200, the first nozzle head 41 and the second nozzle head 42 of two orbital maneuver apparatuses on two sides of the traveling object 200 for example may be driven to orient to point in different directions respectively so that high-pressured fluid may eject in the corresponding directions with respect to the traveling object 200. This may allow the traveling object 200 such as an air vehicle or even a rocket to perform customized and prompt turning.

Figure 7B:
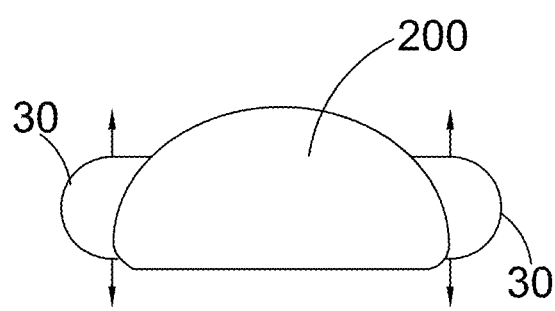

Referring to FIG. 7B of the drawings, in the situation where several orbital maneuver apparatuses are mounted at two sides of the traveling object 200, the first nozzle head 41 and the second nozzle head 42 of two orbital maneuver apparatuses on two sides of the traveling object 200 may be driven to orient to point in upward and downward directions respectively so that high-pressured fluid may eject in the corresponding directions respectively with respect to the traveling object 200. This may allow the traveling object 200 to perform customized ascending or descending.

Figure 7C:
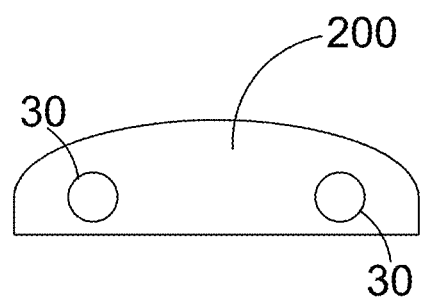

Referring to FIG. 7C of the drawings, in the situation where several orbital maneuver apparatuses are mounted at a rear side of a traveling object 200, all nozzle heads 41 (42) of the orbital maneuver apparatuses may be driven to orient to point in the same directions so that high-pressured fluid may eject in the corresponding directions with respect to the traveling object 200. This may allow the traveling object 200 to perform customized orbital change.

It is worth mentioning that by controlling the rotation of the actuation head 30 and the angle of inclination of the first nozzle head 41 and the second nozzle head 42, and the pressure of the high-pressured fluid, the orbital maneuver apparatus of the present invention may "maneuver" the traveling orbit of the traveling object 200 on which it is mounted. The change of orbit may include turning, ascending, descending or other changes.

The present invention therefore resolves the problems presented in the conventional commercial or military traveling objects in which change of orbits require high power and complicated mechanical components, such as different types of wings in aircrafts. The orbital maneuver apparatus of the present invention may realize orbital change of the traveling object 200 without the need to utilize the traditional mechanical parts of these vehicles.

Moreover, the high-pressure fluid utilized by the orbital maneuver apparatus of the present invention may be obtained through a wide variety of mechanisms. For example, when the orbital maneuver apparatus is used in a sea vehicle, the high-pressure fluid may be high pressure fluid discharged by other components of the sea vehicle. Such high-pressure fluid may be re-heated to meet the pressure requirement of the orbital maneuver apparatus for changing the orbit of the sea vehicle. Alternatively, high-pressure water may be supplied (through other apparatuses) to the fluid supply arrangement 10 for providing high-pressure fluid to the nozzle assembly 40.

Figure 8:
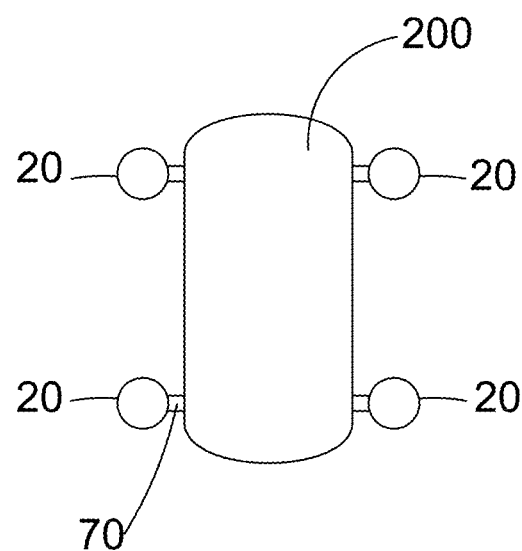
FIG. 8 illustrates an alternative method of mounting the orbital maneuver apparatuses of the present invention on a traveling object such as an air vehicle or a sea vehicle.

Each of the orbital maneuver apparatuses of the present invention may be mounted on the traveling object such that only the actuation head 31 may be exposed to an exterior of thereof. As shown in FIG. 8 of the drawings, as an alternative, each of the entirety of the orbital maneuver apparatuses may also be mounted at a distance from the traveling object 200 through a specifically structured connecting tube 70. The connecting tube 70 may connect the orbital maneuver apparatus to the high-pressure fluid source provided in the traveling object 200.

It is worth mentioning that the orbital maneuver apparatus described above may achieve particular beneficial results for commercial, military or aerospace traveling objects 200. With the use of the orbital maneuver apparatuses on the traveling object 200, the traveling object 200 may facilitate orbital change or orbital maneuvering even when the traveling object 200 is traveling at extremely high speed, such traveling over ultrasonic speed, without mechanical limitations as compared to wings on traditional flying objects.

The digital control system 100 may be configured to utilize Artificial Intelligence (AI) to control the orbital maneuver apparatuses so as to facilitate precision displacement and maneuverability requirements of the traveling object 200, such as maneuverable orbital change for vertical ascend and descend, 360° directional drift by the traveling object 200, mid-air hovering, or prompt adjustment of traveling direction and displacement. These cannot be accomplished by traditional "wing-type" flying, in which wings may be controlled by pneumatics or hydraulic mechanisms. The traveling object 200 employing the orbital maneuver apparatus of the present invention does not need to use pneumatics or hydraulic mechanisms to facilitate orbital maneuvering.

In addition, the orbital maneuver apparatus as utilized in sea traveling object 200, such as a naval warship, may overcome the traditional disadvantages of having very slow orbital maneuvering (due to the use of propellers) and facilitate prompt and accurate orbital maneuvering, such as 360° rotation or maneuvering.

The present invention, while illustrated and described in terms of a preferred embodiment and several alternatives, is not limited to the particular description contained in this specification. Additional alternative or equivalent components could also be used to practice the present invention.

What is claimed is:

1. An orbital maneuver apparatus, comprising:
   a fluid supply arrangement which comprises a control valve connecting to a source of high-pressure fluid, and a fluid supply tube connecting to the control valve;
   a main body which comprises an outer housing, an inner housing mounted in the outer housing in such a manner that the inner housing is arranged to rotate about a longitudinal direction of the main body, the fluid supply tube extending in the inner housing of the main body being stationary with respect to the outer housing;
   an actuation head connected to the inner housing of the main body so that the when the inner housing rotates with respect to the outer housing, the actuation head is also driven to rotate in a synchronized manner along the longitudinal direction of the main body, the actuation head having an actuation cavity formed therein; and
   a nozzle assembly which comprises a first nozzle head which is in fluid communication with the fluid supply tube, and is movably supported in the actuation cavity and is arranged to rotate correspondingly with the actuation head, the first nozzle head being arranged to further rotate about a transverse direction of the main body, so that the first nozzle head is arranged to be controlled to selectively point toward predetermined orientation, such that when the compressed fluid is arranged to eject through the first nozzle head, the orbital maneuver apparatus is arranged to change an orbit of a traveling object on which the orbital maneuver apparatus is mounted.

2. The orbital maneuver apparatus, as recited in claim 1, wherein the nozzle assembly further comprise a second nozzle head which is in fluid communication with the fluid supply tube, and is movably supported in the actuation cavity and is arranged to rotate correspondingly with the actuation head, the second nozzle head being arranged to further rotate about a transverse direction of the main body, so that the second nozzle head is arranged to be controlled to selectively point toward predetermined orientation for changing an orbit of the traveling object on which the orbital maneuver apparatus is mounted.

3. The orbital maneuver apparatus, as recited in claim 2, wherein the main body further has a receiving cavity, and comprises at least one driving motor mounted in the receiving cavity for driving the inner housing to rotate with respect to the outer housing along a longitudinal direction of the main body, the inner housing and the actuation head are arranged to selectively and in synchronized manner to rotate in a 360 degrees range of motion.

4. The orbital maneuver apparatus, as recited in claim 3, wherein each of the outer housing and the inner housing is configured to have a substantially cylindrical and hollow structure, wherein the fluid supply tube extends through the inner housing along a longitudinal direction of the main body.

5. The orbital maneuver apparatus, as recited in claim 4, wherein the main body further comprises a brake device comprising at least one braking disc mounted in the receiving cavity and engaged with an exterior surface of the inner housing so as to selectively perform deceleration thereof.

6. The orbital maneuver apparatus, as recited in claim 5, wherein the main body further comprises a heat insulation layer provided between the fluid supply tube and the inner housing of the main body so as to prevent heat from transferring from the fluid supply tube to the surroundings.

7. The orbital maneuver apparatus, as recited in claim 3, wherein the actuation head has a hollow structure and a convexly curved exterior surface, the fluid supply tube extending in the actuation cavity of the actuation head to connect to the first nozzle head and the second nozzle head so as to establish fluid communication between the fluid supply tube and the first nozzle head and the second nozzle head, the fluid supply tube, the first nozzle head and the second nozzle head forming a three-way passage structure.

8. The orbital maneuver apparatus, as recited in claim 7, wherein the first nozzle head and the second nozzle head are be connected to the fluid supply tube in the actuation cavity in a pivotally movable manner, so that each of the first nozzle head and the second nozzle head is arranged to pivotally rotate about a transverse direction of the main body in an approximately 180 degrees range of motion.

9. The orbital maneuver apparatus, as recited in claim 8, wherein the first nozzle head has a first connecting portion and a first ejection portion extending from the first connecting portion, the first connecting portion extending along a transverse direction of the main body, the first ejection portion extending along a longitudinal direction of the main body to form a substantially L-shaped structure of the first nozzle head, the first nozzle head further having a first ejection channel extending along the first connecting portion and the first ejection portion for allowing passage of high-pressure fluid.

10. The orbital maneuver apparatus, as recited in claim 9, wherein the second nozzle head has a second connecting portion and a second ejection portion extending from the second connecting portion, the second connecting portion extending along a transverse direction of the main body, the second ejection portion extending along a longitudinal direction of the main body to form a substantially L-shaped structure of the second nozzle head, the second nozzle head further having a second ejection channel extending along the second connecting portion and the second ejection portion for allowing passage of high-pressure fluid.

11. The orbital maneuver apparatus, as recited in claim 10, wherein the nozzle assembly further comprises a first nozzle motor and a second nozzle motor mounted in the actuation head to drive the first nozzle head and the second nozzle head to pivotally move in the actuation cavity respectively.

* * * * *